US008856812B1

(12) United States Patent
Lin et al.

(10) Patent No.: US 8,856,812 B1
(45) Date of Patent: Oct. 7, 2014

(54) EMERGENCY DISC EJECTING DEVICE FOR OPTICAL DISC DRIVE

(71) Applicant: Lite-On IT Corporation, Taipei (TW)

(72) Inventors: Wu-Chen Lin, Hsinchu (TW); Chun-Wei Chang, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 14/086,976

(22) Filed: Nov. 22, 2013

(30) Foreign Application Priority Data

Aug. 5, 2013 (CN) .......................... 2013 1 0335691

(51) Int. Cl.
*G11B 17/04* (2006.01)
*G11B 17/051* (2006.01)

(52) U.S. Cl.
CPC .................................... *G11B 17/051* (2013.01)
USPC .......................................... 720/624; 720/636

(58) Field of Classification Search
CPC ............... G11B 17/056; G11B 17/051; G11B 17/0515; G11B 17/0405; G11B 17/0404
USPC ................... 720/624, 636, 647, 609
See application file for complete search history.

(56) References Cited

U.S. PATENT DOCUMENTS

| 5,777,978 | A  | * | 7/1998  | Ota et al. ...................... 720/693 |
| 5,886,977 | A  | * | 3/1999  | Ota et al. ...................... 720/665 |
| 6,208,606 | B1 | * | 3/2001  | Saito ............................. 720/609 |
| 6,275,459 | B1 | * | 8/2001  | Obata et al. .................. 720/636 |
| 6,922,837 | B2 | * | 7/2005  | Chang ........................... 720/609 |
| 7,127,727 | B2 | * | 10/2006 | Hsu et al. ...................... 720/637 |
| 7,325,242 | B2 | * | 1/2008  | Yokota .......................... 720/609 |
| 7,784,068 | B2 | * | 8/2010  | Fujisawa ....................... 720/636 |
| 7,966,627 | B2 | * | 6/2011  | Yang et al. .................... 720/619 |
| 7,996,857 | B2 | * | 8/2011  | Tanaka et al. ................. 720/609 |
| 8,060,897 | B2 | * | 11/2011 | Wang et al. ................... 720/651 |
| 8,091,098 | B2 | * | 1/2012  | Wang et al. ................... 720/609 |
| 8,132,193 | B2 | * | 3/2012  | Ahn et al. ..................... 720/617 |
| 2013/0132980 | A1 | * | 5/2013 | Choi et al. .................... 720/624 |
| 2014/0115612 | A1 | * | 4/2014 | Choi et al. .................... 720/624 |

* cited by examiner

*Primary Examiner* — Brian Miller
(74) *Attorney, Agent, or Firm* — Jianq Chyun IP Office

(57) ABSTRACT

An emergency disc ejecting device for an optical disc drive including a linkage module and a gear module is provided. The linkage module has a first linkage capable of moving along a disc loading direction and a disc ejecting direction. The gear module includes a first gear, a second gear and a pulley. The first gear is detachably connected to the first linkage. The second gear is driveably connected to the first gear and has a first contacting portion. The pulley is pivoted on the second gear and has a second contacting portion, wherein the second gear has an idle-stroking rotation relative to the pulley. When the second gear performs the idle-stroking rotation relative to the pulley, the first contacting portion moves relatively from a first side of the second contacting portion to a second side of the second contacting portion.

11 Claims, 7 Drawing Sheets

EMERGENCY DISC EJECTING DEVICE FOR OPTICAL DISC DRIVE

CROSS-REFERENCE TO RELATED APPLICATION

This application claims the priority benefit of China application serial no. 201310335691.6, filed on Aug. 5, 2013. The entirety of the above-mentioned patent application is hereby incorporated by reference herein and made a part of this specification.

TECHNICAL FIELD

The disclosure relates to a disc ejecting device for an optical disc drive, and more particularly, to an emergency disc ejecting device for an optical disc drive.

BACKGROUND

Following the rapid advance in information technology, computers have become an indispensable tool in our daily life. To render the functions of the computer more diversified, many computer peripheral products and add-ons have become important tools in enhancing the capability of the computers. In terms of data storage media, storage devices capable of storing data and reading devices capable of accessing the storage devices have also become the focus of the computer peripheral products. Since optical discs have advantages in low cost, easy to carry, large storage capacity, easy to preserve, long storage life and less susceptible to damage, the optical discs are gradually replacing the conventional magnetic storage media. Due to the widespread use of the optical discs, optical disc drives capable of accessing the optical discs have also become common computer peripheral products in daily life.

The optical disc drives may be classified as tray-type optical disc drives and slot-in type optical disc drives according to the mechanism for loading an optical disc, wherein the slot-in type optical disc drives may further be classified as the roller type and the clamp type. Taking the roller type optical disc drive for an example, when the optical disc is put into the optical disc drive from an panel opening of the optical disc drive, the optical disc drive uses a drive motor and a gear module to drive the roller into rotation so as to send the optical disc onto the spindle motor, and thus a reading module of the optical disc drive may access the data in the optical disc. When the optical disc is done being used, the optical disc drive uses the drive motor to drive a linkage to push the optical disc to the roller, and then uses the rotation of the roller to move the optical disc out of the optical disc drive. Accordingly, under a normal circumstance, loading and ejecting actions of the optical disc may be performed by the drive motor and the internal components (such as the linkage or the gear module) of the optical disc drive.

When the drive motor or a circuit board has a malfunction and causes the optical disc drive to be unable to automatically move the optical disc in and out of the optical disc drive in accordance with normal procedures, the general design is to insert a needle-shaped object into the optical disc drive to manually push the internal components of the optical disc drive from outside of the optical disc drive, so as to eject the optical disc. However, in the slot-in type optical disc drives, the loading and ejecting actions of the optical disc are mainly driven by the drive motor and the gear module, such that it is not easy for the user to use the needle-shaped object to resist a high torque generated by the drive motor and to push the internal components of the optical disc drive to eject the optical disc.

SUMMARY OF THE INVENTION

The invention provides an emergency disc ejecting device for an optical disc drive with an idle-stroking design, so as to prevent internal components of the optical disc drive from being damaged during an emergency ejection.

The emergency disc ejecting device for an optical disc drive of the invention includes a linkage module and a gear module. The linkage module has a first linkage, wherein the first linkage is capable of moving along a disc loading direction and a disc ejecting direction. The gear module includes a first gear, a second gear and a pulley. The first gear is detachably connected to the first linkage. The second gear is driveably connected to the first gear and has a first contacting portion. The pulley is pivoted on the second gear and has a second contacting portion, wherein the second gear has an idle-stroking rotation relative to the pulley. When the second gear performs the idle-stroking rotation relative to the pulley, the first contacting portion relatively moves from a first side of the second contacting portion to a second side of the second contacting portion.

In one embodiment of the invention, when the idle-stroking rotation is relatively performed between the second gear and the pulley, only one of the second gear and the pulley is rotating In one embodiment of the invention, in disc loading process, when the second gear is rotating, the second gear via the first contacting portion pushes the second contacting portion to drive the pulley into rotation together.

In one embodiment of the invention, the first linkage has a gear rack, and the first linkage is engaged with the first gear through the gear rack.

In one embodiment of the invention, the optical disc drive has a roller configured to drive an optical disc to be loaded or ejected from the optical disc drive. The first linkage has a first inclined surface. When the optical disc is loaded, the first linkage moves along the disc ejecting direction, and the first inclined surface is configured to suppress the roller, so that the roller is away from the optical disc and the optical disc is bared on a spindle motor of the optical disc drive.

In one embodiment of the invention, the optical disc drive has a clamp configured to clamp an optical disc on a spindle motor of the optical disc drive. The linkage module further includes a second linkage, and the second linkage has a second inclined surface capable of moving along the disc loading direction and the disc ejecting direction. When ejecting the optical disc, the second linkage moves along the disc loading direction, and the second inclined surface is configured to push the clamp away from the spindle motor so as to release the optical disc.

In one embodiment of the invention, the linkage module further includes a third linkage rotatably disposed within the optical disc drive. During an emergency ejection, the first linkage moves along the disc loading direction, and the first linkage pushes the third linkage in to rotation so that the third linkage pushes a loaded optical disc out of the optical disc drive.

In one embodiment of the invention, during the emergency ejection, the first linkage is manually pushed to move along the disc loading direction and to drive the first gear into rotation, thereby driving the second gear to perform the idle-stroking rotation relative to the pulley, so that the first contacting portion relatively moves from the first side of the second contacting portion to the second side of the second contacting portion.

In one embodiment of the invention, after the first contacting portion is relatively moved from the first side of the second contacting portion to the second side of the second contacting portion, the first linkage is detached from the first gear.

In one embodiment of the invention, the linkage module further includes a third linkage rotatably disposed within the optical disc drive. After the first contacting portion is relatively moved from the first side of the second contacting portion to the second side of the second contacting portion, the first linkage is detached from the first gear, and the first linkage is further manually pushed to move along the disc loading direction and to push the third linkage into rotation, so that the third linkage pushes a loaded optical disc out of the optical disc drive.

In one embodiment of the invention, the optical disc drive has a roller, and the roller is connected with the pulley via a belt. When the third linkage pushes the loaded optical disc out of the optical disc drive, the optical disc drives the roller into rotation and thereby drives the pulley to perform the idle-stroking rotation relative to the second gear, so that the first contacting portion relative moves from the second side of the second contacting portion to the first side of the second contacting portion.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
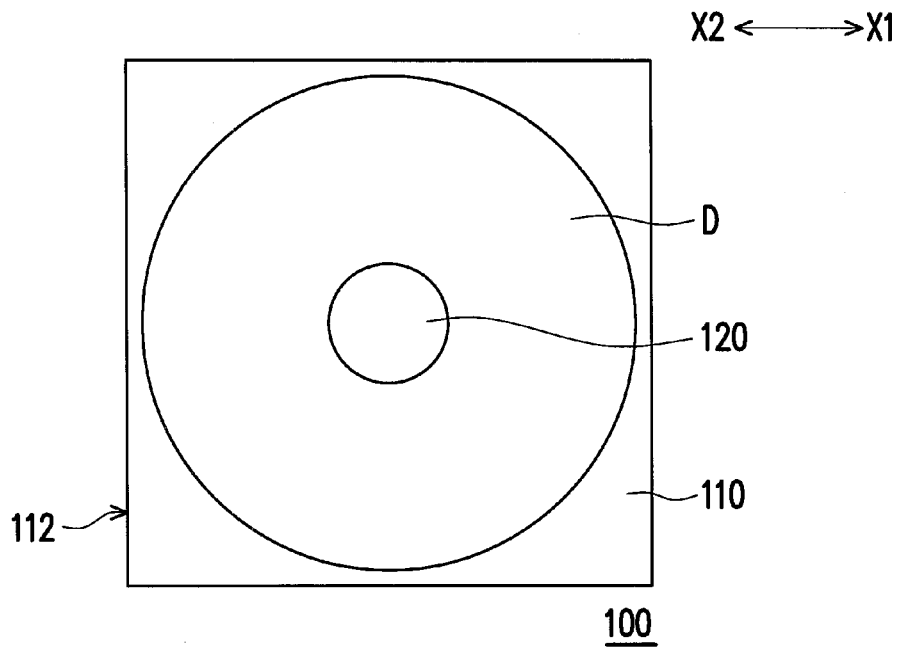
FIG. 1A and FIG. 1B are schematic diagrams illustrating an optical disc ejecting operation for an optical disc drive according to an embodiment of the invention.
Figure 1B:
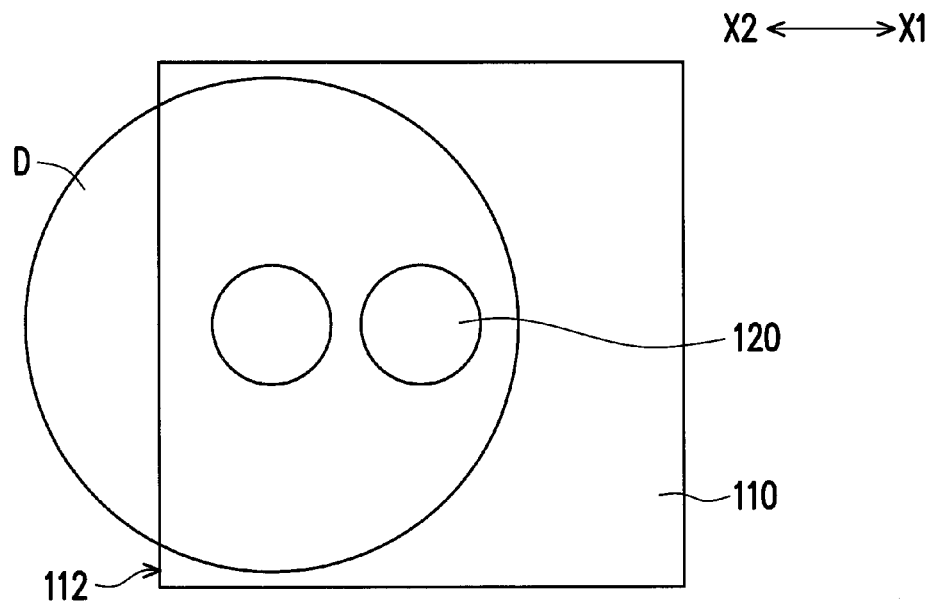
Figure 2A:
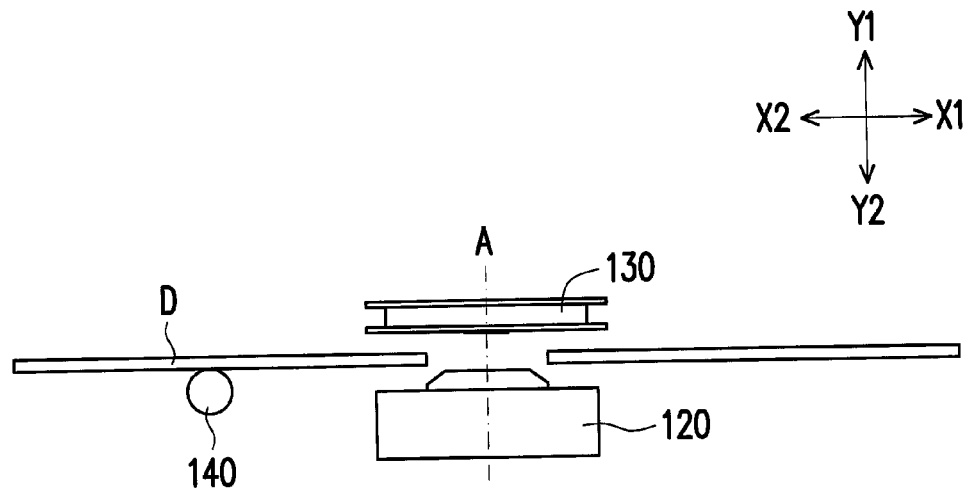
FIG. 2A and FIG. 2B are schematic diagrams illustrating an optical disc clamping operation for an optical disc drive depicted in FIG. 1A.
Figure 2B:
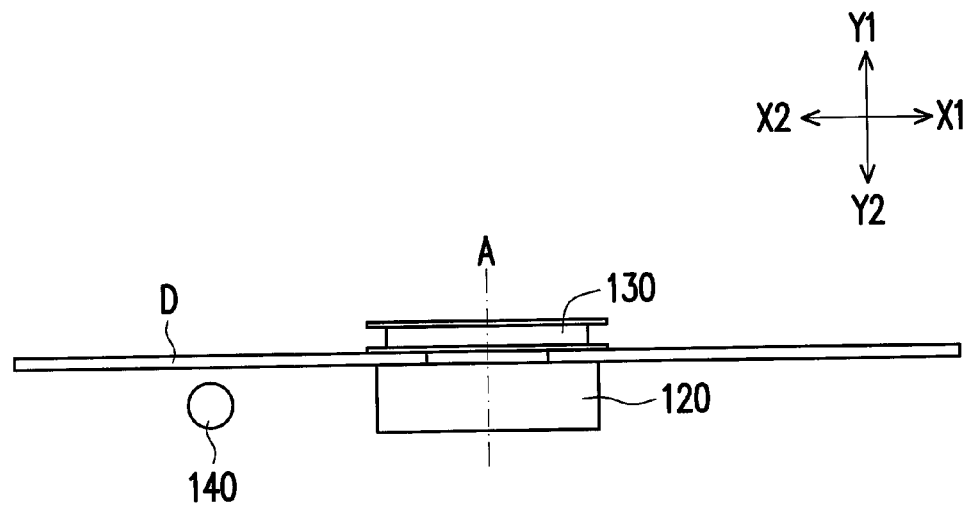

FIG. 1A and FIG. 1B are schematic diagrams illustrating an optical disc ejecting operation for an optical disc drive according to an embodiment of the invention. FIG. 2A and FIG. 2B are schematic diagrams illustrating an optical disc clamping operation for an optical disc drive depicted in FIG. 1A. Referring to FIG. 1A through FIG. 2B, in the present embodiment, an optical disc drive 100 includes a casing 110, a spindle motor 120, a clamp 130, a roller 140 and a reading module (not shown). The optical disc drive 100 is configured to read the optical disc D, wherein the spindle motor 120, the clamp 130, the roller 140 and the reading module are disposed within the casing 110. The optical disc D is adopted to enter the casing 110 from an opening 112 of the casing 110 and be clamped by the clamp 130 to be disposed on the spindle motor 120 (as shown in FIGS. 1A and 2B), so as to read the data on an optical disc D via the reading module. The optical disc D can be ejected out of the casing 110 from the opening 112 of the casing 110 (as shown in FIG. 1B).

Specifically, in the present embodiment, the clamp 130 and the roller 140 are movably disposed within the casing 110, respectively, wherein the clamp 130 is configured to clamp the optical disc D on the spindle motor 120 of the optical disc drive 100, and the roller 140 is configured to drive the optical disc D to be loaded or unloaded from the optical disc drive 100. FIG. 2A is a schematic diagram illustrating the optical disc before being clamped; now, the clamp 130 and the roller 140 are respectively at first positions. FIG. 2B is a schematic diagram illustrating the optical disc after being clamped; now, the clamp 130 and the roller 140 are respectively at second positions. In addition, the roller 140 is rotatably disposed within the casing 110. When the optical disc D is not yet loaded, the clamp 130 and the roller 140 are both respectively located at the first positions, and when the optical disc D enters the casing 110 from the opening 112 and is in contact with the roller 140, the optical disc D moves into the casing 110 through a rotation of the roller 140, namely, moves towards a X1 direction (a disc loading direction), until a center hole of the optical disc D is corresponded to the spindle motor 120 (as shown in FIG. 2A). Now, the roller 140 is being driven to move downwards, namely, move towards a Y2 direction, to the second position, so that the optical disc D is then being lowered and bared on the spindle motor 120 (as shown in FIG. 1A). The clamp 130 is also being driven to move downwards, namely, move towards the Y2 direction, to the second position, and clamps the optical disc D jointly with the spindle motor 120 (as shown in FIG. 2A to FIG. 2B). When the clamp 130 and the spindle motor 120 jointly clamp the optical disc D, the optical disc drive 100 may read the data of the optical disc D through the reading module.

Hence, when the optical disc D is completely loaded, the clamp 130 and the roller 140 are both located at the second positions, respectively. Relatively, when a user wants to eject the optical disc D out of the casing 110 of the optical disc drive 100, the clamp 130 is being driven to move upwards, namely, move towards a Y1 direction, to return to the first position, so as to release the optical disc D. Next, the roller 140 is also being driven to move upwards, namely, move towards the Y1 directions, to return to the first position, so as to push the optical disc D away from the spindle motor 120 and enable the optical disc D to abut against the roller 140 (as shown in FIG. 2B to FIG. 2A). Then, the optical disc D moves out of the casing 110 through the reverse rotation of the roller 140 (as shown in FIG. 1B), namely, moves towards a X2 direction (a disc ejecting direction).

The above-described actions of moving the optical disc D in and out of the casing 110 via the roller 140 and jointly clamping the optical disc D via the clamp 130 and the spindle motor 120 may be driven by a disc loading and ejecting device disposed within the casing 110. The disc loading and ejecting device includes a drive motor (not shown) and internal components (such as a linkage module and a gear module). In other words, under a normal condition, the above-described actions relating to the clamp 130 and the roller 140 moving between the first positions and the second positions, and the optical disc D being moved in or out of the casing 110 through the rotation of the roller 140, may be attained through driving the mutually linked internal components by the drive motor disposed within the casing 110. Relatively, when the optical disc drive 100 is under an abnormal condition (e.g., when the drive motor has a malfunction), in order to allow the user to perform an emergency ejection by inserting a needle-shaped object into the casing 110 to replace the driving of the drive motor, and to manually operate the mutually linked internal components to eject the optical disc D, the invention provides an emergency disc ejecting device. The emergency disc ejecting device, in addition to automatically loading and ejecting the optical disc under a normal use, may also enable the user to manually eject the optical disc during malfunction. In the following below, specific structure and mode of operation of the emergency disc ejecting device of the optical disc drive 100 are described in detail with reference to figures.

Figure 3:
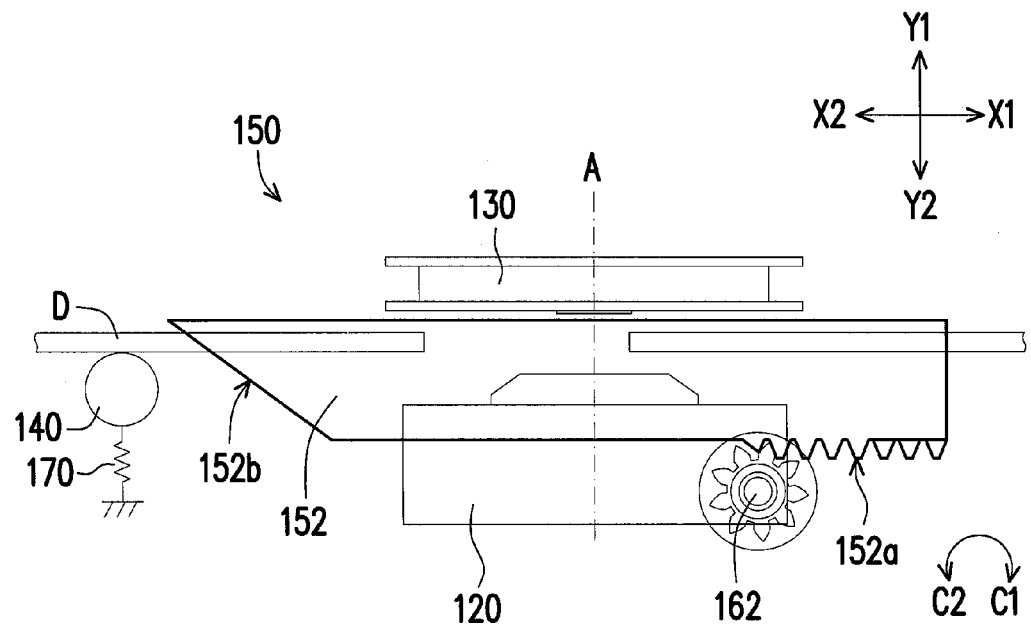
FIG. 3 is a partial enlarged schematic diagram illustrating a first linkage of the emergency disc ejecting device for an optical disc drive depicted in FIG. 1A.
Figure 4:
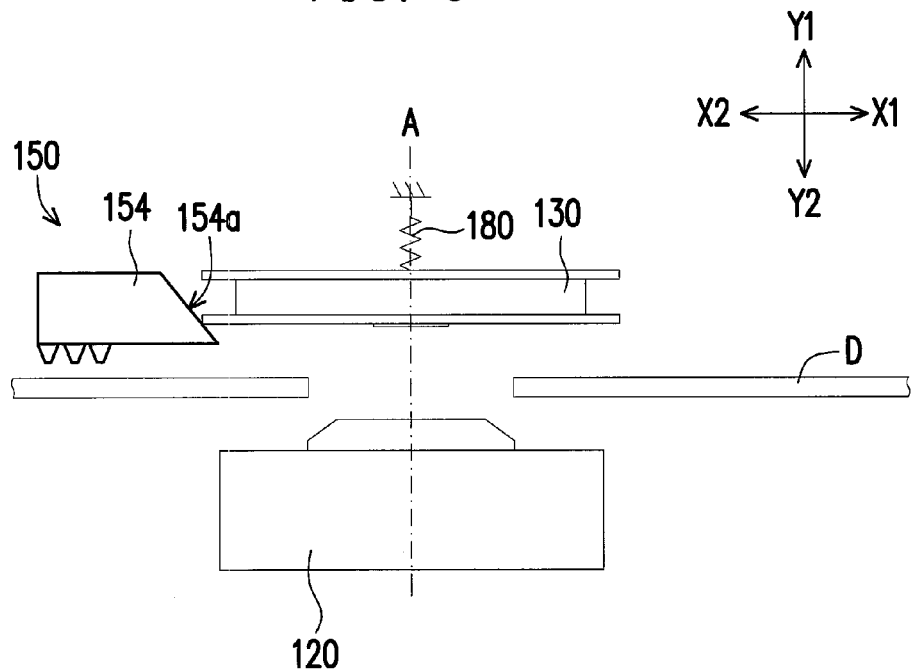
FIG. 4 is a partial enlarged schematic diagram illustrating a second linkage of the emergency disc ejecting device for an optical disc drive depicted in FIG. 1A.
Figure 5A:
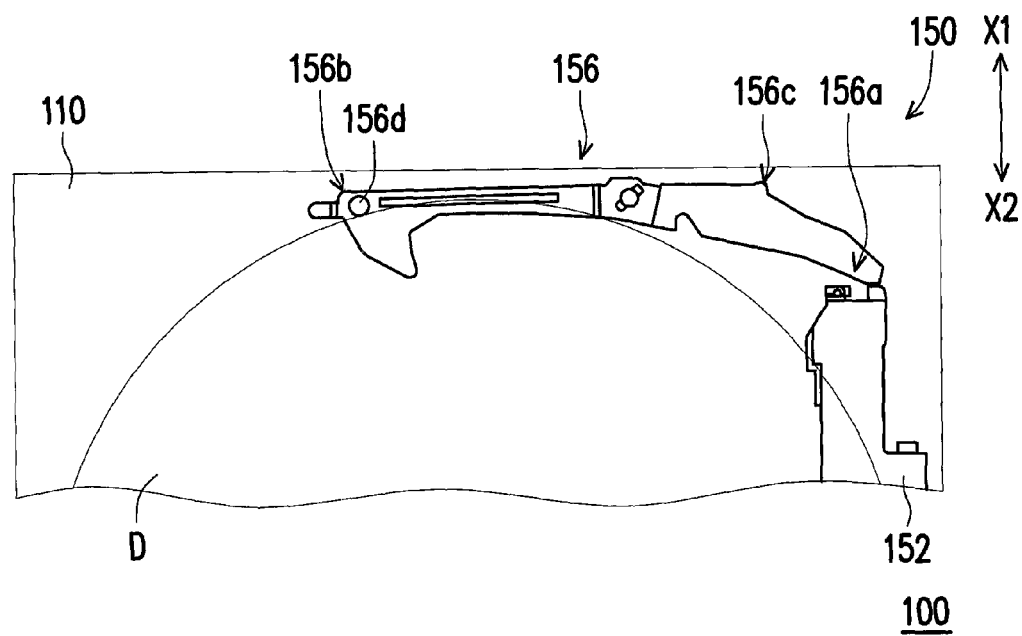
FIG. 5A and FIG. 5B are partial enlarged schematic diagrams illustrating a third linkage of the emergency disc ejecting device for an optical disc drive depicted in FIG. 1A.
Figure 5B:
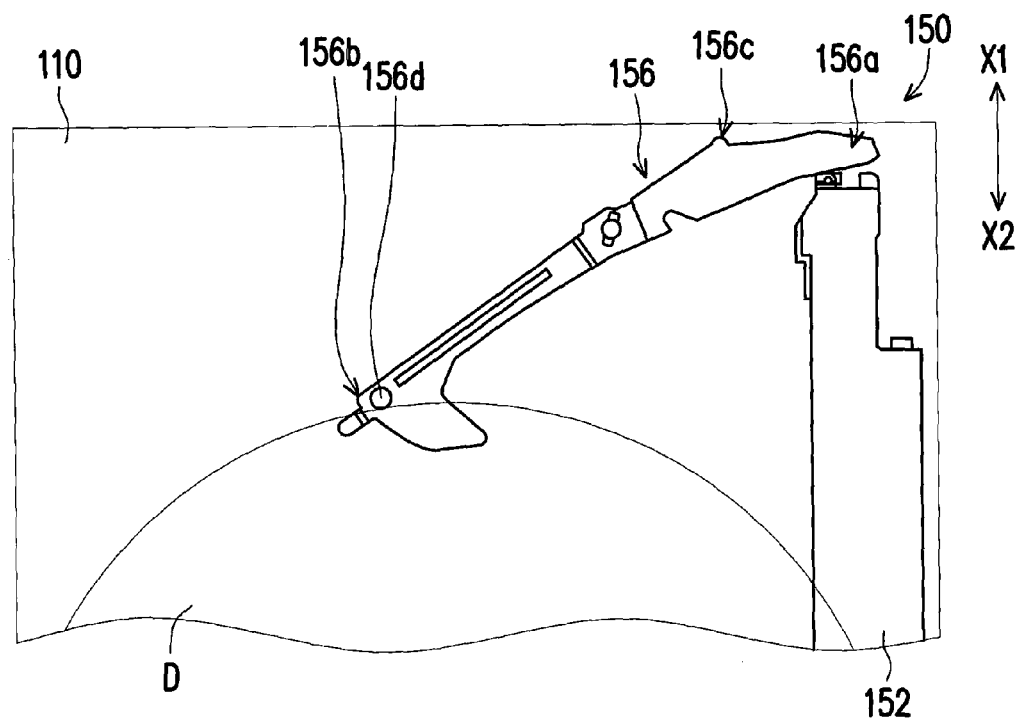
Figure 6A:
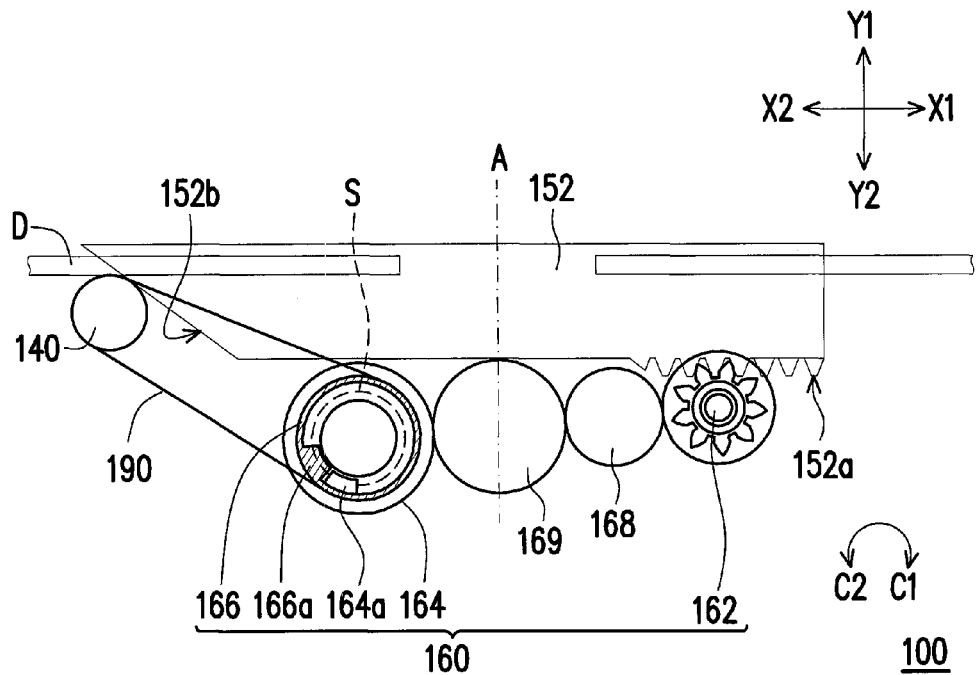
FIG. 6A is a partial enlarged schematic diagram illustrating a gear module of the emergency disc ejecting device for an optical disc drive depicted in FIG. 1A.

FIG. 3 is a partial enlarged schematic diagram illustrating a first linkage of the emergency disc ejecting device for an optical disc drive depicted in FIG. 1A. FIG. 4 is a partial enlarged schematic diagram illustrating a second linkage of the emergency disc ejecting device for an optical disc drive depicted in FIG. 1A. FIG. 5A and FIG. 5B are partial enlarged schematic diagrams illustrating a third linkage of the emergency disc ejecting device for an optical disc drive depicted in FIG. 1A. FIG. 6A is a partial enlarged schematic diagram illustrating a gear module of the emergency disc ejecting device for an optical disc drive depicted in FIG. 1A. Referring to FIG. 3 through FIG. 6A, in the present embodiment, the emergency disc ejecting device includes a linkage module 150 and a gear module 160, and the gear module 160 is connected to the linkage module 150. The linkage module 150 includes a first linkage 152, a second linkage 154 and a third linkage 156 (illustrated in FIG. 3 through FIG. 5B), and the gear module 160 includes a first gear 162, a second gear 164, a pulley 166, a third gear 168 and a fourth gear 169 (illustrated in FIG. 6A). The linkage module 150 and the gear module 160 may be mutually linked and drive the clamp 130 and the roller 140.

In a normal use, the gear module 160 is driven by the drive motor (not shown) into rotation, and thereby drives the rotation of the roller 140 and the action of the linkage module 150 to load or unload the optical disc D. Under an abnormal use, such as when the drive motor has a malfunction, the user may insert a needle-shaped object into the casing 110 to push the first linkage 152 to drive the rotations of the gear module 160 and the roller 140 and the actions of other linkages, so as to eject the optical disc.

Specifically, referring to FIG. 3, in the present embodiment, the first linkage 152 of the linkage module 150 has a gear rack 152a and a first inclined surface 152b respectively located at two opposite sides of the first linkage 152. The first linkage 152 may move along the disc loading direction (the X1 direction) and the disc ejecting direction (the X2 direction). The first linkage 152 is engaged and mutually linked with the first gear 162 through the gear rack 152a, and the first linkage 152 via the first inclined surface 152b pushes the roller 140 towards the Y2 direction to move to the second position, thereby being away from the optical disc D. More specifically, in the present embodiment, the optical disc drive 100 further includes a first elastic member 170 disposed between the casing 110 and the roller 140 for providing a restoring force to the roller 140, so that the roller 140 moves toward the Y1 direction to return to the first position, thereby being close to the optical disc D. The first linkage 152, by being close to or away from the roller 140, suppresses or releases the roller 140 via the first inclined surface 152b, so as to enable the roller 140 to move towards the Y2 or Y1 direction to be away or close to the optical disc D.

Accordingly, when loading the optical disc D, the first linkage 152 is to move towards the disc ejecting direction, namely, move towards the X2 direction, so that the first inclined surface 152b of the first linkage 152 is close to and suppresses the roller 140, and then the roller 140 subjected to the suppression of the first inclined surface 152b moves away from the optical disc D and toward the Y2 direction to the second position, thereby enabling the optical disc D to be loaded at the spindle motor 120. Now, since the gear rack 152a of the first linkage 152 is engaged with the first gear 162, the first gear 162 is to rotate along a second clock direction C2, wherein the second clock direction C2, for example, is a counter-clockwise direction depicted in FIG. 3. Relatively, when ejecting the optical disc D, the first linkage 152 is to move towards the disc loading direction, namely, move towards the X1 direction, so that the first inclined surface 152b of the first linkage 152 is away from and releases the roller 140, and then the roller 140 subjected to the restoring force of the first elastic member 170 moves toward the Y1 direction and returns to the first position to push the optical disc D away from the spindle motor 120, thereby enabling the optical disc D to abut against the roller 140. Now, since the gear rack 152a of the first linkage 152 is engaged with the first gear 162, the first gear 162 is to rotate along a first clock direction C1, wherein the first clock direction C1, for example, is a clockwise direction depicted in FIG. 3.

Referring to FIG. 4, in the present embodiment, the clamp 130 driven by the second linkage 154 of the linkage module 150 is adapted to move between the first position and the second position, and to jointly clamp the optical disc D with the spindle motor 120. In the present embodiment, the optical disc drive 100 further includes a second elastic member 180 disposed between the casing 110 and the clamp 130 for providing a suppression force onto the clamp 130, so that the clamp 130 clamps the optical disc D onto the spindle motor 120. The second linkage 154 has a second inclined surface 154a configured to resist the aforementioned suppression force, and the second linkage 154 may move along the disc loading direction (the X1 direction) and the disc ejecting direction (the X2 direction) to drive the clamp 130 to move from the second position to the first position. Accordingly, when the optical disc D is not yet loaded, the second linkage 154 is located at a position as depicted in FIG. 4, and the second inclined surface 154a of the second linkage 154 supports the clamp 130 to resist the aforementioned suppression force, so that the clamp 130 is located at the first position. When the optical disc D is loaded to a position corresponded to the spindle motor 120, the second linkage 154 is driven to move towards the disc ejecting direction (the X2 direction), and thereby releases the clamp 130 to enable the clamp 130 to move towards the Y2 direction to the second position, so as to clamp the optical disc D onto the spindle motor 120. Relatively, when ejecting the optical disc D, the second linkage 154 is driven to move towards the disc loading direction (the X1 direction), so that the second inclined surface 154a of the second linkage 154 supports the clamp 130 to resist the aforementioned suppression force to push the clamp 130 to move from the second position to the first position, so as to be away from the spindle motor 120 to release the optical disc D. Now, as mentioned in above, the first linkage 152 is driven to move towards the X1 direction, so that the roller 140 subjected to the restoring force of the first elastic member 170 is to move towards the Y1 direction and return to the first position, thereby pushing the optical disc D away from the spindle motor 120 and enabling the optical disc D to abut against the roller 140. Finally, the optical disc D is ejected out of the casing 110 through the rotation of the roller 140.

In view of the above, under the condition that the clamp 130 and the spindle motor 120 jointly clamp the optical disc D, when the optical disc D is to be ejected, the linkage module 150 firstly, via the second linkage 154, drives the clamp 130 to move from the second position, towards the Y1 direction, to the first position, and then, via the first linkage 152, drives the roller 140 to move from the second position, towards the Y1 direction, to the first position to push the optical disc D away from the spindle motor 120. Relatively, when the optical disc D is to be loaded, after the optical disc D is moved into the casing 110 through the rotation of the roller 140, the linkage module 150 firstly, via the first linkage 152, drives the roller 140 to move from the first position, towards the Y2 direction, to the second position to position the optical disc D on the spindle motor 120, and then, via the second linkage 154, drives the clamp 130 to move from the first position, towards the Y2 direction, to the second position to jointly clamp the optical disc D with the spindle motor 120.

It is to be noted that, in the present embodiment, the first linkage 152 and the second linkage 154 may be a same component. In other words, the first linkage 152 and the second linkage 154 may be an integrally formed component, and this component may concurrently have the gear rack 152a, the first inclined surface 152b and the second inclined surface 154a, and the actuations of the second inclined surface 154a and the first inclined surface 152b may have a slight time difference with an appropriate design, so that the first inclined surface 152b and the second inclined surface 154a, during the loading and ejecting processes of the optical disc D, can successively drive the roller 140 and the clamp 130 to move between the first positions and the second positions. However, in other embodiments, the first linkage 152 and the second linkage 154 may also be two independent linkages that are connected with each other, and the invention is not limited thereto.

Referring to FIG. 5A and FIG. 5B, in view of the above, in the process of ejecting the optical disc D, after the first linkage 152 and the second linkage 154 respectively drive the roller 140 and the clamp 130 to move the optical disc D away from the spindle motor 120, the linkage module 150 via the first linkage may further 152 drive the third linkage 156 to push the optical disc D out of the casing 110. In the present embodiment, the third linkage 156 is rotatably disposed within the optical disc drive 100 and has a first terminal 156a, a second terminal 156b, a pivot point 156c located between the first terminal 156a and the second terminal 156b, and a protrusion 156d located at the second terminal 156b. The third linkage 156 is pivoted on the casing 110 via the pivot point 156c, wherein the first terminal 156a and the second terminal 156b can rotate in relative to the pivot point 156c, and the protrusion 156d is adapted to abut against a side edge of the optical disc D. Therefore, after the first linkage 152 and the second linkage 154 respectively drive the roller 140 and the clamp 130 to move the optical disc D away from the spindle motor 120, if the first linkage 152 is further driven to move towards the disc loading direction (the X1 direction), then the first linkage 152 is to push the first terminal 156a of the third linkage 156 to enable the third linkage 156 to start rotation by using the pivot point 156c as an axis, and enable the protrusion 156d of the second terminal 156b to push the optical disc D to move towards the outside of the casing 110, namely, enable the optical disc D to move towards the disc ejecting direction (the X2 direction), as shown in FIG. 5A and FIG. 5B.

According to the above contents and FIG. 3 through FIG. 5B, it can be known that the optical disc drive 100, via the first linkage 152, the second linkage 154 and the third linkage 156 of the linkage module 150, may control the clamp 130 and the roller 140 in the actions of clamping and releasing the optical disc D and pushing the optical disc D towards the outside of the casing 110. Each linkage of the linkage module 150 has a time difference when executing the above-mentioned actions, so as to avoid the internal components from interfering with each other during the ejecting process. For instance, the linkage module 150 firstly drives the clamp 130 to move away from the spindle motor 120, and then drives the roller 140 to push the optical disc D away from the spindle motor 120. Afterward, under a normal operation of the drive motor, the roller 140 driven by the gear module 160 may drive the optical disc D to move out of the casing 110 through rotating. In addition, under a condition that the drive motor is unable to operate normally, the first linkage 152 may further be pushed to move towards the disc loading direction (the X1 direction), thereby driving the third linkage 156 into rotation and to push the optical disc D towards the disc ejecting direction (the X2 direction) and to eject out of the casing 110.

Referring to FIG. 6A, in the present embodiment, the gear module 160 includes the first gear 162, the second gear 164, the pulley 166, the third gear 168 and the fourth gear 169. The first gear 162 is detachably connected to the first linkage 152 of the linkage module 150, and may be mutually actuated with the linkage module 150. The third gear 168 and the fourth gear 169 are located between the first gear 162 and the second gear 164, and belong to a driving gear module connected between the first gear 162 and the second gear 164. The driving gear module in the present embodiment, for example, is taken as two gears (the third gear 168 and the fourth gear 169), but the quantity of the driving gear module is not limited thereto. The first gear 162 and the second gear 164 may be mutually actuated through the driving gear module therebetween. In addition, in other embodiments, the gear module 160 of the optical disc drive 100 may omit the configuration of the driving gear module (the third gear 168 and the fourth gear 169), and the second gear 164 may be directly engaged at the first gear 162, such that the invention does not intend to limit whether the driving gear module (the third gear 168 and the fourth gear 169) has to be configured or not. Similarly, in other embodiments, the first gear 162 and the second gear 164 may be configured with even more driving gears therebetween for linking the first gear 162 and the second gear 164 in action, but the invention is not limited thereto.

Furthermore, in the present embodiment, the second gear 164 is driveably connected to the first gear 162 via the driving gear module (the third gear 168 and the fourth gear 169) and has the first contacting portion 164a. The pulley 166 is pivoted on the second gear 164 and has the second contacting portion 166a, wherein the first contacting portion 164a and the second contacting portion 166a can be abutted against each other, and the second gear 164 has an idle-stroking rotation relative to the pulley 166. When the second gear 164 performs the idle-stroking rotation relative to the pulley 166, the first contacting portion 164a relatively moves from a first side of the second contacting portion 166a to a second side of the second contacting portion 166a, so that the second gear 164 rotates in relative to the pulley 166 but does not push the pulley 166. Relatively, when the second gear 164 has a general rotation relative to the pulley 166, the first contacting portion 164a and the second contacting portion 166a are abutted against each other, so that the second gear 164 and the pulley 166 may rotate at the same time. The roller 140 is disposed within the casing 110 and is connected with the pulley 166 through a belt 190. Accordingly, when the first gear 162 rotates along the first clock direction C1 (such as a clockwise direction depicted in FIG. 6A), the first gear 162 may drive the second gear 164 to rotate along the second clock direction C2 (such as a counter-clockwise direction depicted in FIG. 6A) through the rotations of the third gear 168 and the fourth gear 169. Relatively, when the first gear 162 rotates along the second clock direction C2, the first gear 162 may drive the second gear 164 to rotate along the first clock direction C1 through the rotations of the third gear 168 and the fourth gear 169. In the present embodiment, the roller 140 is connected to the pulley 166 pivoted on the second gear 164 through the belt 190, and when the second gear 164 rotates, the pulley 166 may be driven into rotation via abutting the first contacting portion 164a against the second contacting portion 166a, and thereby driven the roller 140 into rotation through the belt 190.

In the present embodiment, during the process of loading the optical disc D, each component in the linkage module 150 and the gear module 160 is driven to move or rotate along a first direction thereof; and during the process of ejecting the optical disc D, each component in the linkage module 150 and the gear module 160 is driven to move or rotate along a second direction thereof, wherein the second direction is opposite to the first direction. In other words, an action of the linkage module 150 and the gear module 160 in ejecting the optical disc D is a reverse action of loading the optical disc D.

Under normal circumstance, when the optical disc D is to be ejected, the drive motor may drive the first gear 162 into rotation so as to drive the linkage module 150 into performing the actions illustrated in FIG. 3 through FIG. 5B, and drive the gear module 160 into rotation and thereby drive the roller 140 into rotation so as to move the optical disc D out of the casing 110. Specifically, under the normal circumstance, when the optical disc D is to be ejected, the drive motor is connected to the first gear 162 of the gear module 160 and drives the first gear 162 into rotation, so that the first gear 162 drives the first linkage 152 and the second linkage 154 to move towards the disc loading direction (the X1 direction) so as to move the optical disc D away from the spindle motor 120 and to abut against the roller 140; details regarding the actuation means thereof are as provided in above, and thus are not to be repeated herein. At the same time, the first gear 162 also drives the second gear 164 into rotation and to abut against the second contacting portion 166a via the first contacting portion 164a so as to drive the pulley 166 into rotation, and thus the pulley 166 drives the roller 140 into rotation via the belt 190, thereby enabling the roller 140 to push the optical disc D out of the casing 110. In other words, when the second gear 164 rotates, the second gear 164 can via the first contacting portion 164a pushes the second contacting portion 166a to drive the pulley 164a into rotation together, and when the pulley 166 rotates, the pulley 166 can via the second contacting portion 166a pushes the first contacting portion 164a to drive the second gear 164 into rotation together.

Relatively, when the drive motor has a malfunction and unable to drive the gear module 160 with electrical power, the user may use the needle-shaped object to push the emergency disc ejecting device into action. The process of the emergency ejection of the optical disc drive 100 of the present embodiment, accompanied by FIG. 6A in conjunction with FIG. 6B and FIG. 6C, is described in detail below.

Figure 6B:
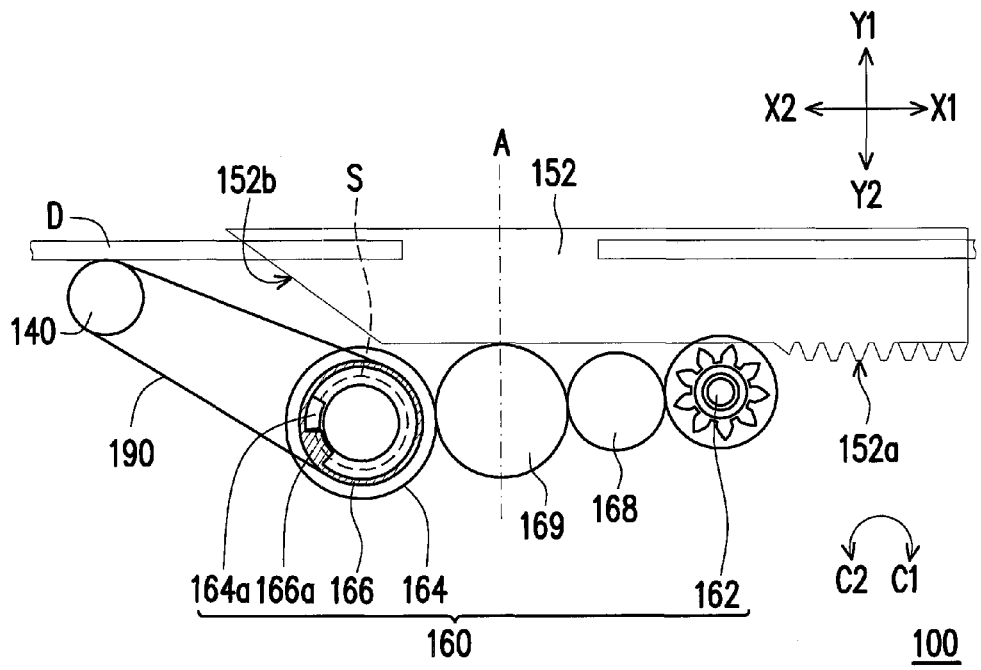
FIG. 6B through FIG. 6C are an actuation flow diagrams illustrating the emergency disc ejecting device for an optical disc drive depicted in FIG. 6A during an emergency ejection.
Figure 6C:
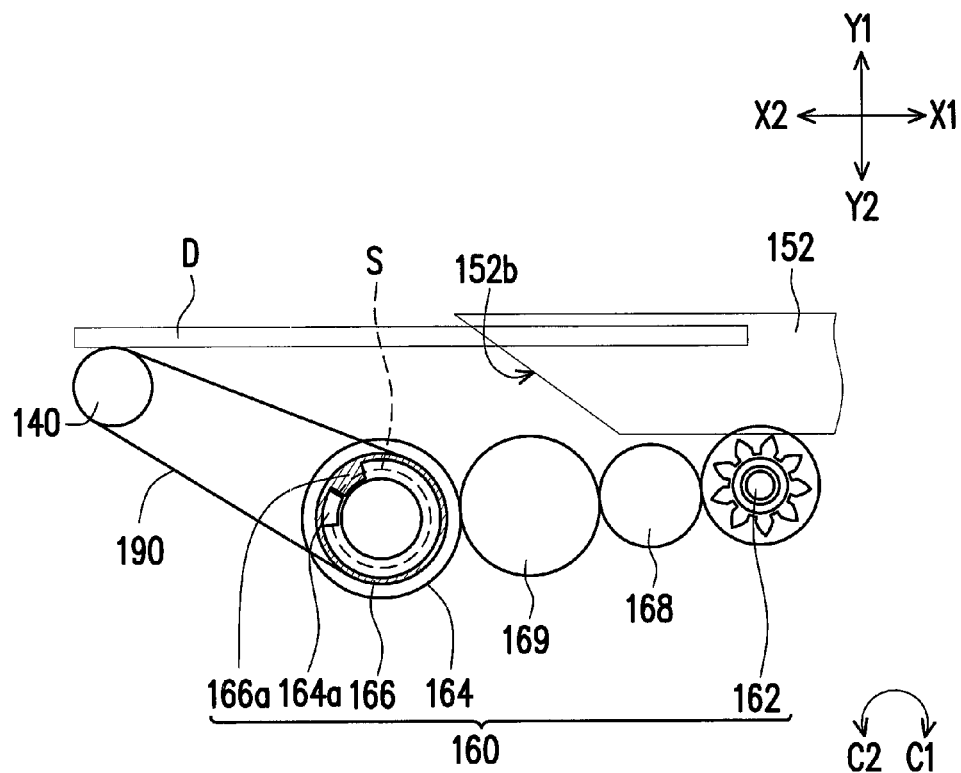

FIG. 6B through FIG. 6C are an actuation flow diagrams illustrating the emergency disc ejecting device for an optical disc drive depicted in FIG. 6A during an emergency ejection. Firstly, before the ejection, the optical disc D is clamped on the spindle motor 120. In other words, the clamp 130 and the roller 140 are both located at the second positions thereof, respectively, as shown in FIG. 2B. Furthermore, since the optical disc D is initially driven by the drive motor and the second contacting portion 166a of the pulley 166 is pushed by the first contacting portion 164a of the second gear 164 to enable the pulley 166 to rotate, the roller 140 is driven by the belt 190 into rotation so as to load the optical disc D. In the present embodiment, when loading the optical disc D, the second gear 164 rotates along the first clock direction C1, and thus, before the ejection, the first contacting portion 164a of the second gear 164 is abutted against the first side of the second contacting portion 166a of the pulley 166, as shown in FIG. 6A.

When the emergency ejection is to be performed, the user may use the needle-shaped object to push the first linkage 152, so that the first linkage 152 is manually pushed to move towards the disc loading direction (the X1 direction) and drives the first gear 162 into rotation and the second linkage 154 into movement, so that the first linkage 152 and the second linkage 154 drive the clamp 130 and the roller 140 to move the optical disc D away from the spindle motor 120 and to abut against the roller 140, and thereby drive the second gear 164 to perform the idle-stroking S rotation relative to the pulley 166. Next, when the user uses the needle-shaped object to further push the first linkage 152 to move towards the disc loading direction (the X1 direction), the gear rack 152a of the first linkage 152 is to depart from the first gear 162, as shown in FIG. 6B. Under the condition of continuously pushing the first linkage 152 to move towards the disc loading direction (the X1 direction), the first linkage 152 is to push the third linkage 156 into rotation, thereby pushing the optical disc D out of the casing 110, so that the third linkage 156 pushes the loaded optical disc D out of the optical disc drive 100 (as shown in FIG. 5B), and completes the emergency ejection.

In the present embodiment, during the process of the emergency ejection, when the first linkage 152 drives the first gear 162 into rotation, the second gear 164 is being driven to rotate along the second clock direction C2 and to perform the idle-stroking S rotation relative to the pulley 166. Now, the first contacting portion 164a of the second gear 164 is to relatively and gradually move from the first side of the second contacting portion 166a of the pulley 166 to the second side of the second contacting portion 166a of the pulley 166, as shown in FIG. 6B. During this period, the second gear 164 does not drive the pulley 166 into rotation. In other words, the second gear 164 has an idle-stroking S rotation relative to the pulley 166, and this idle-stroking S rotation is configured to relatively move the first contacting portion 164a from the first side of the second contacting portion 166a to the second side of the second contacting portion 166a, and vice versa, as shown in FIG. 6A to FIG. 6B and FIG. 6B to FIG. 6C. In addition, after the first contacting portion 164a is relatively moved from the first side of the second contacting portion 166a to the second side of the second contacting portion 166a, the first linkage 152 and the first gear 162 are separated, as shown in FIG. 6B.

Next, after the gear rack 152a of the first linkage 152 is detached from the first gear 162, the first linkage 152 is further manually pushed to move along the disc loading direction (the X1 direction) and to push the third linkage 156 into rotation, so that the third linkage 156 pushes the loaded optical disc D out of the optical disc drive 100. When the third linkage 156 pushes the optical disc D out of the casing 110, the first linkage 152 does not drive the first gear 162 into rotation. Since the optical disc D is currently abutted against the roller 140, when the third linkage 156 pushes the loaded optical disc D out of the optical disc drive 100 and the optical disc D moves toward the disc ejecting direction (the X2 direction), the optical disc D still drives the roller 140 into rotation, and drives the pulley 166 by the belt 190 into rotation along the second clock direction C2. Now, the optical disc D drives the pulley 166 to perform the idle-stroking S rotation relative to the second gear 164, so that the second contacting portion 166a of the pulley 166 is to relatively and gradually move from the first side of the first contacting portion 164a of the second gear 164 to the second side of the first contacting portion 164a of the second gear 164, as shown in FIG. 6B to FIG. 6C. In other words, when the pulley 166 performs the idle-stroking S rotation relative to the second gear 164, the pulley 166 does not drive the second gear 164. Therefore, when the optical disc D is pushed by the third linkage 156 to move towards outside of the casing 110 and drives the roller 140 into rotation, the roller 140 drives the pulley 166 to rotate along the second clock direction C2, but does not drive the second gear 164 and the first gear 162 of the gear module 160 into rotation. Accordingly, with the design of the idle-stroking S rotation, it does not require to apply a force for resisting a high torque generated by the drive motor during the emergency ejection, thus preventing the gear module 160 from generating an unintended destruction.

Figure 7A:
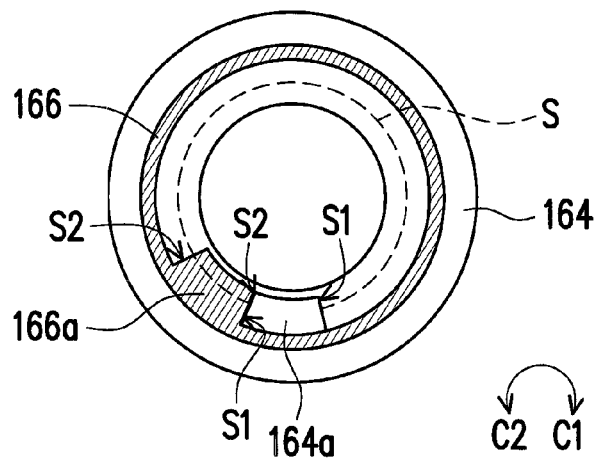
FIG. 7A through FIG. 7C are partial enlarged schematic diagrams illustrating a first contacting portion and a second contacting portion of the emergency disc ejecting device for an optical disc drive depicted in FIG. 6A through FIG. 6C.
Figure 7B:
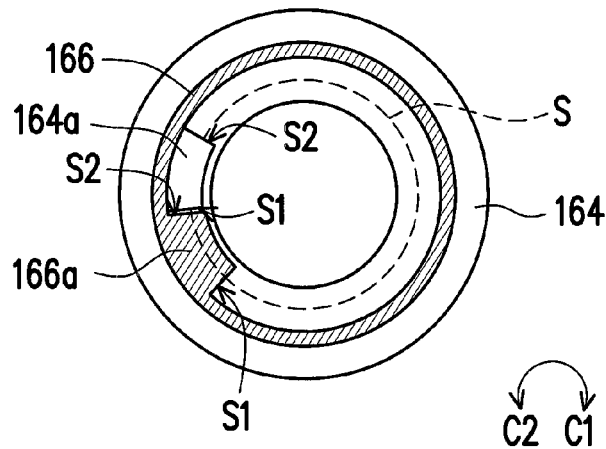
Figure 7C:
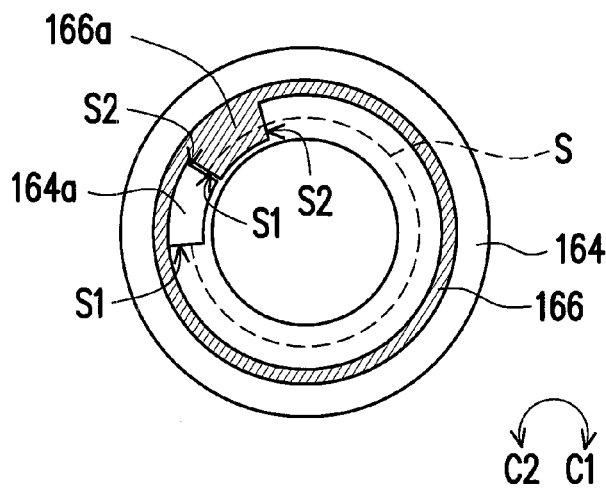

FIG. 7A through FIG. 7C are partial enlarged schematic diagrams illustrating a first contacting portion and a second contacting portion of the emergency disc ejecting device for an optical disc drive depicted in FIG. 6A through FIG. 6C. Referring to FIG. 7A through FIG. 7C, in the present embodiment, the first contacting portion 164a of the second gear 164 and second contacting portion 166a of the pulley 166 respectively have a first side S1 and a second side S2 opposite to the first side S1. The second gear 164 is adapted to firstly position the second side S2 of the first contacting portion 164a aside the first side S1 of the second contacting portion 166a, as shown in FIG. 7A, and then is adapted to position the first side S1 of the first contacting portion 164a aside the second side S2 of the second contacting portion 166a after performing the idle-stroking S rotation relative to the pulley 166 along the second clock direction C2, as shown in FIG. 7B. Accordingly, during the process of the second gear 164 performing the idle-stroking S rotation relative to the pulley 166 along the second clock direction C2, the second gear 164 does not drive the pulley 166. Similarly, the pulley 166 is adapted to firstly position the second side S2 of the second contacting portion 166a aside the first side S1 of the first contacting portion 164a, as shown in FIG. 7B, and is then adapted to position the first side S1 of the second contacting portion 166a aside the second side S2 of the first contacting portion 164a after performing the idle-stroking S rotation relative to the second gear 164 along the second clock direction C2, as shown in FIG. 7C. Accordingly, during the process of the pulley 166 performing the idle-stroking S rotation relative to the second gear 164 along the second clock direction C2, the pulley 166 does not drive the second gear 164. In other words, when the idle-stroking S rotation is relative performed between the second gear 164 and the pulley 166, only one of the second gear 164 and the pulley 166 is rotating, and the first contacting portion 164a of the second gear 164 and the second contacting portion 166a of the pulley 166 do not push each other into rotation. Accordingly, by respectively configuring the first contacting member 164a and the second contacting member 166a at the second gear 164 and the pulley 166 and enabling the second gear 164 to have the idle-stroking S rotation relative to the pulley 166, it may effectively prevent the user from taking a long time to perform the emergency ejection through using the needle-shaped object to push the entire gear module into action, and thereby further prevent the need to resist the high torque generated by the drive motor.

In reference to the disclosure herein, for purposes of convenience and clarity only, directional terms, such as top, bottom, left, right, up, down, above, below, clockwise direction, and counter-clockwise direction, are used with respect to the accompanying drawings. In other words, such directional terms used in conjunction with the above description of the drawings are merely provided as examples for purposes of description, and should not be construed to limit the actual direction of movement of the internal components of optical disc drive 100 of the invention, or the scope of the invention, in any manner not explicitly set forth in the appended claims.

In summary, the emergency disc ejecting device for an optical disc drive 100 of the invention, with the designs of the first contacting portion 164a and the second contacting portion 166a of the second gear 164 and the pulley 166 of the gear module 160, enables the second gear 164 to have the idle-stroking S rotation relative to the pulley 166. Therefore, when the linkage module 150 pushes the optical disc D to move towards outside of the casing 110 so as to drive the roller 140, the roller 140 may drive the pulley 166 to perform the idle-stroking S rotation relative to the second gear 164 without having to drive the second gear 164 and the first gear 162. Accordingly, the emergency disc ejecting device of the invention of the idle-stroking S rotation design, and may effectively prevent the internal components of the optical disc drive 100 from being damaged due to the actions of the emergency ejection.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An emergency disc ejecting device for an optical disc drive, comprising:
   a linkage module having a first linkage, wherein the first linkage capable of moving along a disc loading direction and a disc ejecting direction; and
   a gear module, comprising:
      a first gear detachably connected to the first linkage;
      a second gear driveably connected to the first gear and having a first contacting portion; and
      a pulley pivoted on the second gear and having a second contacting portion abutted against the first contacting portion, wherein the second gear has an idle-stroking rotation relative to the pulley, and when the second gear performs the idle-stroking rotation relative to the pulley, the first contacting portion moves relatively from a first side of the second contacting portion to a second side of the second contacting portion.

2. The emergency disc ejecting device for the optical disc drive as recited in claim 1, wherein when the idle-stroking rotation is relatively performed between the second gear and the pulley, only one of the second gear and the pulley is rotating.

3. The emergency disc ejecting device for the optical disc drive as recited in claim 1, wherein, in disc loading process, when the second gear is rotating, the second gear via the first contacting portion pushes the second contacting portion to drive the pulley into rotation together.

4. The emergency disc ejecting device for the optical disc drive as recited in claim 1, wherein the first linkage has a gear rack, and the first linkage is engaged with the first gear through the gear rack.

5. The emergency disc ejecting device for the optical disc drive as recited in claim 1, wherein the optical disc drive has a roller configured to drive an optical disc to be loaded or ejected from the optical disc drive, and the first linkage has a first inclined surface, wherein when the optical disc is loaded, the first linkage moves along the disc ejecting direction, and the first inclined surface is configured to suppress the roller, so that the roller is away from the optical disc and the optical disc is bared on a spindle motor of the optical disc drive.

6. The emergency disc ejecting device for the optical disc drive as recited in claim 1, wherein the optical disc drive has a clamp configured to clamp an optical disc on a spindle motor of the optical disc drive, the linkage module further comprises a second linkage, and the second linkage has a second inclined surface capable of moving along the disc loading direction and the disc ejecting direction, wherein when ejecting the optical disc, the second linkage moves along the disc loading direction, and the second inclined surface is configured to push the clamp away from the spindle motor so as to release the optical disc.

7. The emergency disc ejecting device for the optical disc drive as recited in claim 1, wherein the linkage module further comprises a third linkage rotatably disposed within the optical disc drive, wherein during an emergency ejection, the first linkage moves along the disc loading direction, and the first linkage pushes the third linkage in to rotation so that the third linkage pushes a loaded optical disc out of the optical disc drive.

8. The emergency disc ejecting device for the optical disc drive as recited in claim 1, wherein during an emergency ejection, the first linkage is manually pushed to move along the disc loading direction and to drive the first gear into rotation, thereby driving the second gear to perform the idle-stroking rotation relative to the pulley, so that the first contacting portion relatively moves from the first side of the second contacting portion to the second side of the second contacting portion.

9. The emergency disc ejecting device for the optical disc drive as recited in claim 8, wherein after the first contacting portion is relatively moved from the first side of the second contacting portion to the second side of the second contacting portion, the first linkage is detached from the first gear.

10. The emergency disc ejecting device for the optical disc drive as recited in claim 8, wherein the linkage module further comprises a third linkage rotatably disposed within the optical disc drive, wherein after the first contacting portion is relatively moved from the first side of the second contacting portion to the second side of the second contacting portion, the first linkage is detached from the first gear, and the first linkage is further manually pushed to move along the disc loading direction and to push the third linkage into rotation, so that the third linkage pushes a loaded optical disc out of the optical disc drive.

11. The emergency disc ejecting device for the optical disc drive as recited in claim 10, wherein the optical disc drive has a roller, and the roller is connected with the pulley via a belt, wherein when the third linkage pushes the loaded optical disc out of the optical disc drive, the optical disc drives the roller into rotation and thereby drives the pulley to perform the idle-stroking rotation relative to the second gear, so that the first contacting portion relative moves from the second side of the second contacting portion to the first side of the second contacting portion.

* * * * *